US008186585B2

(12) United States Patent
Popowski

(10) Patent No.: US 8,186,585 B2
(45) Date of Patent: May 29, 2012

(54) INTEGRATED ON-LINE DOOR CONTROL SYSTEM WITH STANDARDIZED INTERFACES

(75) Inventor: Paul M. Popowski, Lake Mills, WI (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/713,649

(22) Filed: Feb. 26, 2010

(65) Prior Publication Data

US 2010/0201479 A1 Aug. 12, 2010

Related U.S. Application Data

(63) Continuation-in-part of application No. 11/782,557, filed on Jul. 24, 2007, now Pat. No. 7,967,197.

(51) Int. Cl.
*G06K 5/00* (2006.01)

(52) U.S. Cl. ....................................... 235/382; 235/380

(58) Field of Classification Search .................. 235/375, 235/380, 382; 340/5.1, 5.2, 5.6, 5.61, 5.64, 340/5.7; 49/61, 62, 98, 159, 279, 303, 324, 49/365, 394, 449; 292/2, 138, 251.5
See application file for complete search history.

(56) References Cited

U.S. PATENT DOCUMENTS 4,929,005 A * 5/1990 Heinen ...................... 292/251.5
5,491,471 A * 2/1996 Stobbe ......................... 340/5.61
5,936,544 A * 8/1999 Gonzales et al. ............ 340/5.22
6,023,224 A * 2/2000 Meyvis ...................... 340/545.1
6,259,352 B1 * 7/2001 Yulkowski et al. ............ 340/5.7
6,486,793 B1 * 11/2002 Buccola ......................... 340/5.2
6,720,861 B1 * 4/2004 Rodenbeck et al. ......... 340/5.64
7,113,073 B2 * 9/2006 Taylor et al. ................. 340/5.27
7,548,151 B2 * 6/2009 Roosli et al. ................... 340/5.6
7,782,175 B2 * 8/2010 Stratmann .................... 340/5.61

* cited by examiner

*Primary Examiner* — Thien M. Le
*Assistant Examiner* — April Taylor
(74) *Attorney, Agent, or Firm* — Husch Blackwell

(57) ABSTRACT

A door access control system includes a pair of housings. One housing is mounted in the door. The other is mounted adjacent to the door in the surrounding frame. The one housing includes an inductor, control circuits coupled to the inductor and a door side interface. The other includes an inductor, control circuits coupled to the inductor and a frame side interface. The door side interface can be coupled to door mounted devices including a card reader, a request for exit interface and a lock interface. The frame side interface can be coupled to frame side communication links which in turn are coupled to a displaced door access control unit. Communication between housings can be carried out via the inductors.

27 Claims, 2 Drawing Sheets

INTEGRATED ON-LINE DOOR CONTROL SYSTEM WITH STANDARDIZED INTERFACES

CROSS-REFERENCE TO RELATED APPLICATION

This application is a continuation-in-part of and claims the benefit of the filing date of parent application, U.S. Utility application Ser. No. 11/782,557 filed Jul. 24, 2007 now U.S. Pat. No. 7,967,197 and entitled "Integrated Online Door Via Electronic Door Handle". The '557application is hereby incorporated by reference herein.

FIELD

The invention pertains to door access systems. More particularly, the invention pertains to such systems where the electronic package for the door side and the frame side exhibit standardized interfaces.

BACKGROUND

Various types of door access/door control systems are known. Some of them incorporate a card reader by which a person seeking access can provide an authorization credential.

Installers of such systems need not only to electrically couple the card reader to the door and to associated circuits and components in the door but also need to interconnect with frame side control systems.

It would be desirable to be able to provide to installers a door access control product which minimizes installation work and effort. It would also be desirable if such product could be used with a variety of different doors, door hardware and associated access control systems with a minimum of reconfiguration needed to take into account different environments.

DETAILED DESCRIPTION

Figure 1:
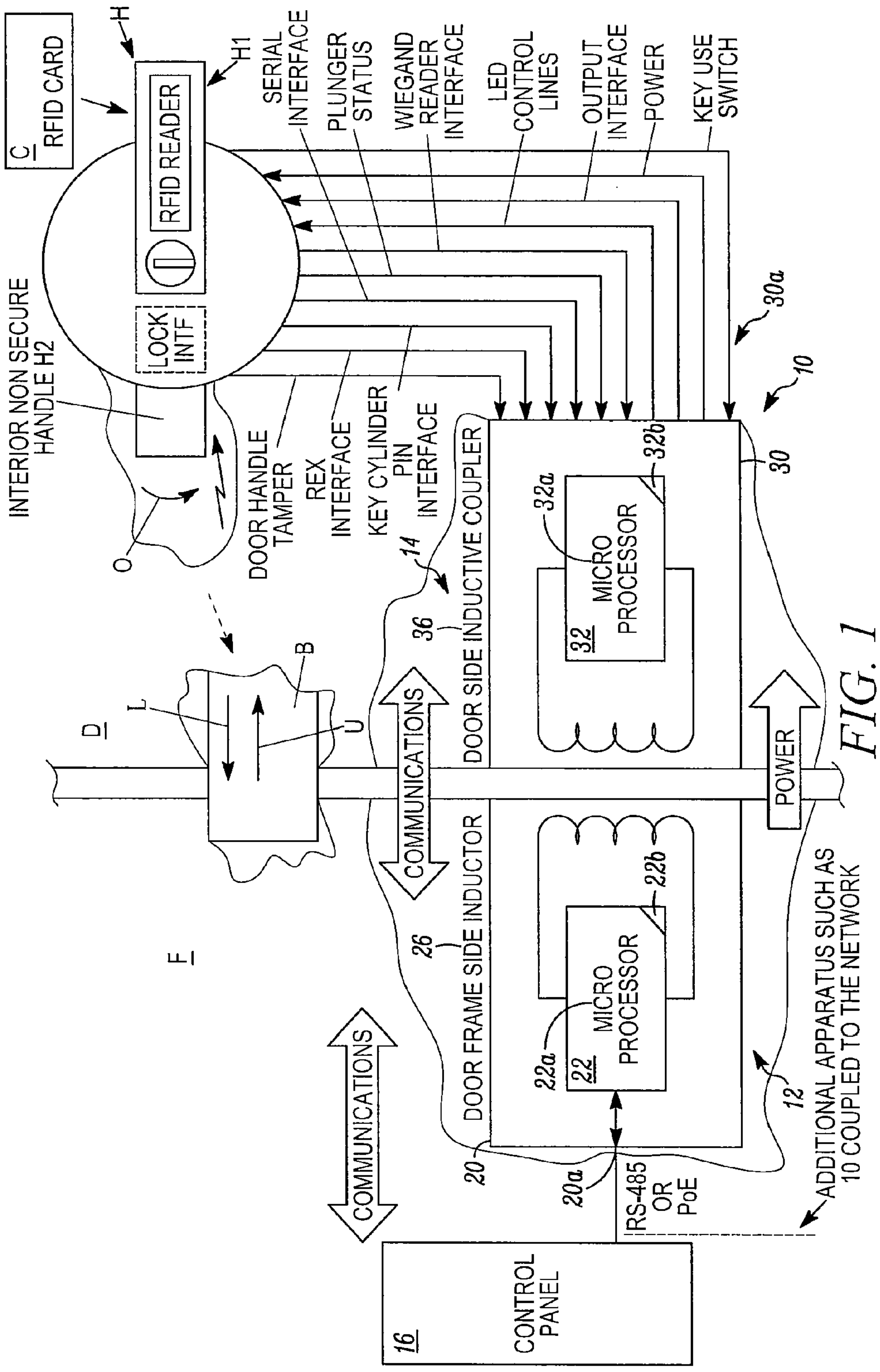
FIG. 1 is a block diagram of an embodiment of the invention.

While embodiments of this invention can take many different forms, specific embodiments thereof are shown in the drawings and will be described herein in detail with the understanding that the present disclosure is to be considered as an exemplification of the principles of the invention, as well as the best mode of practicing same, and is not intended to limit the invention to the specific embodiment illustrated.

Embodiments of a door access control system in accordance with the invention include a pair of housings or modules. One housing, or module, is mounted in the door being controlled. The other is mounted adjacent to the door in the surrounding frame.

The one housing includes an inductor, control circuits coupled to the inductor and a door side interface. The other includes an inductor, control circuits coupled to the inductor and a frame side interface. The door side interface can be coupled to door mounted devices including a card reader, a request to exit interface and a lock interface. The frame side interface can be coupled to frame side communication links which in turn are coupled to a displaced door access control unit.

Communication between housings can be carried out via the inductors. Electrical energy can be transferred from the frame side housing to the door side housing via the inductors where the door is in a pre-determined position relative to the frame. The frame side module receives traffic transmitted to it from the control unit over the network connection. It in turn modulates the data received and couples the modulated date to a frame side inductor to be coupled to the door side inductor, part of the door side module.

In one aspect of the invention, a method to communicate to a door handle is provided which uses inductive couplers to transmit power uni-directionally and data bi-directionally. Sensor inputs can be generated in the door handle and communicated to a door side module. The door side module can in turn communicate with a frame side module and displaced monitoring or control unit. Advantageously, the mechanical details of the door lock/unlock mechanism can vary provided the required input/output signals are couplable to and available from that mechanism.

FIG. 1 illustrates a multi-module apparatus 10 which embodies the invention. The apparatus 10 is illustrated installed in a door frame F and in an associated door D. A handle H is coupled to the apparatus 10 as described below. Those of skill in the art will understand that apparatus 10 can be one member of a plurality of identical structures, each of which is installed on a different door.

The module 12 is in turn coupled via a network, for example an Ethernet-type, to a monitoring unit or control panel 16. Other communications protocols such as RS-485 could also be used without departing from the spirit and scope of the invention.

The frame side module 12 includes a housing 20 which carries an input/output port 20*a*, which is coupled to the network connection. Housing 20 also carries control circuits 22. Circuits 22 could be implemented as a programmable processor 22*a* and associated control software 22*b* which would be stored on a computer readable medium, for example, semiconductor memory.

An inductor 26 is coupled to the circuits 22. Electrical energy as well as commands, and/or data can be coupled from the control unit 16, via the network connection to the port 20*a* and the to the control circuits 22. The inductor 26 can also coupled commands, data and electrical energy to the door side module 14.

Door side module 14 includes a housing 30 which carries an input/output port(s) indicated generally at 30*a*. The housing 30 also carries control circuits 32 which could be implemented as a programmable processor 32*a* and associated control software 32*b* which would be stored on a computer readable storage medium, such as a semiconductor storage unit.

A door side inductor 36 is also carried in housing 30. The inductor 36 can receive electrical energy from the frame side inductor 26 along with commands and/or data and couple same to the control circuits 32. As a result, no door battery is needed.

The module 14 can receive signals from and couple signals to the handle H as illustrated in FIG. 1. It will be understood that the input/output signals to the handle H are exemplary only.

Handle H can carry a card reader, for example an RFID-type card reader. Those of skill will understand that the card reader could be located anywhere on the unsecured side of the respective door. The location of the card reader is not a limitation of the invention.

The respective RFID card C provides authorization to unlock the bolt B from the frame F so that the door D can be opened. Handle H also carries a secure door opening handle H1 to retract bolt B in response to card C being accepted by the apparatus 10, in combination with control panel 16. In this regard, the handle H includes a mechanical lock interface, shown in phantom, to enable handle H1 to engage the bolt B and move it in the direction U to unlock the door D under command of module 14 when card C has been accepted.

Acceptance of card C can be by control panel 16 in response to a bit stream being received by module 14 on the RFD reader input interface line. That bit stream can be transmitted to module 12 via the inductors 36, 26 and then to the panel 16 via the network connection. Panel 16 can in turn determine that the card C is an authorized credential for the door D and then transmit, via the network and module 12 a door open command to module 14. Module 14 can in turn generate an output to the lock interface which releases the handle H1 to retract the bolt B to open the door D.

Handle H can also carry an interior, non-secure handle H2 that a person in a region closed by the door D can use to generate a request exit REX signal to the module 14. The internal user can move handle H2 in direction O to generate the REX signal to module 14 and also mechanically retract the bold B in direction U to unlock the door D. Upon release of the handle H2, as the door D closes, the bolt B can move in direction L to lock the door D closed against the door frame F.

Figure 2:
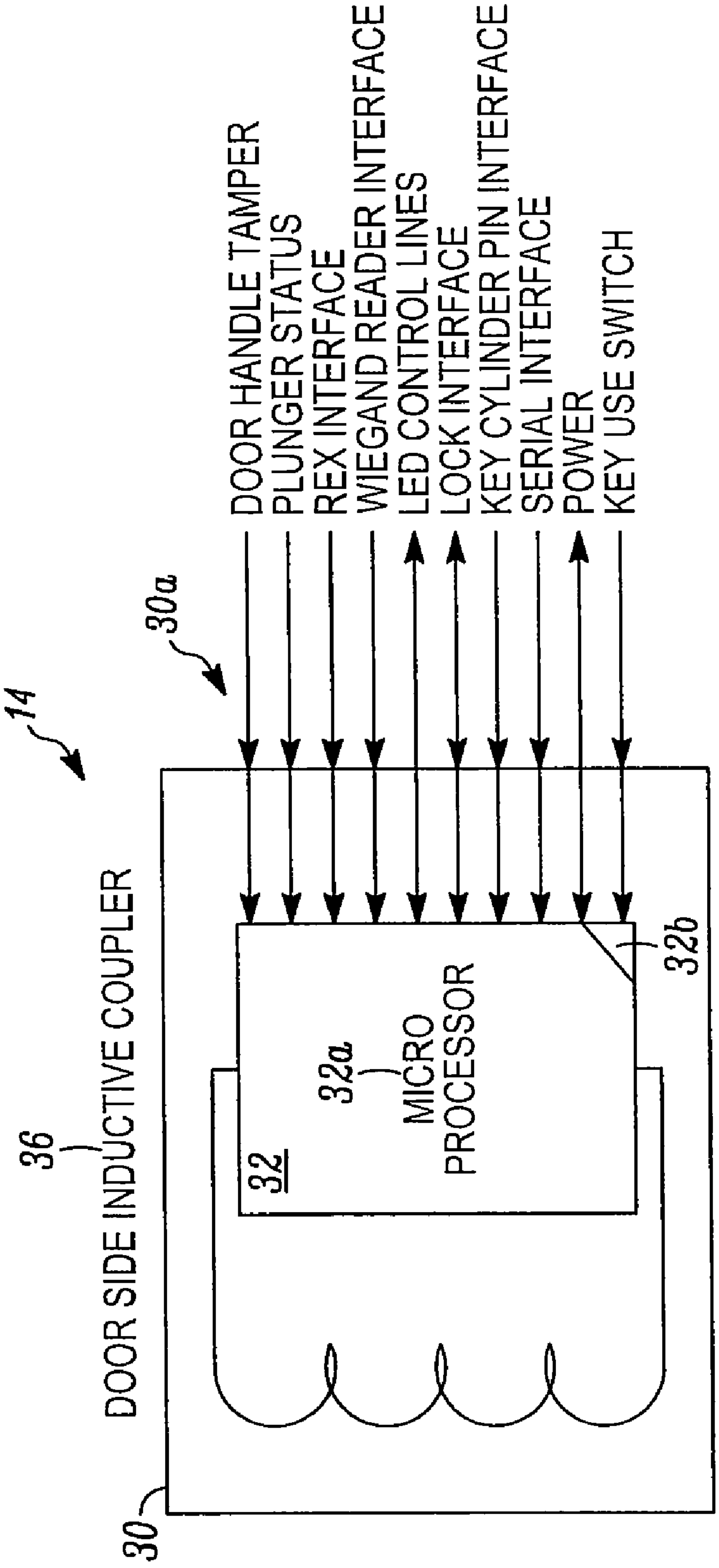
FIG. 2 is a block diagram illustrating aspects of the door side module.

FIG. 2 illustrates various aspects of the exemplary module 14. It will be understood that other combinations and variations of the door side module 14 come within the spirit and scope of the invention.

Other types of functionality come within the spirit and scope of the invention. For example, and without limitation, a variety of events/messages/data can be transmitted between the door side control unit 14 and the displaced control panel 16. For example, a smart card could be programmed via the door side control unit 14, the control programs 32*b* of the door control unit 14 could be revised, or upgraded, to modify functionality thereof, or provide upgraded features. In yet another aspect of the invention, the information transmitted between the various elements, including door side units 14 and the control unit 16 could be encrypted.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A door security apparatus comprising:

a door mountable unit having a housing, the housing carries an electrical energy receiving inductor, and control circuits, carried in the housing, coupled to the inductor where the control circuits receive electrical energy from the inductor and couple communications to the inductor;

a plurality of input ports carried on the housing with at least some of the input ports coupled to the control circuits, the input ports receive door related signals where one of the input ports couples exit request indicia to the control circuits; and a plurality of output ports carried on the housing with at least one of the output ports coupled to the control circuits.

2. An apparatus as in claim 1 where the housing includes a power supply coupled to the inductor and the control circuits.

3. An apparatus as in claim 1 where one of the input ports receives door access authorization indicia.

4. An apparatus as in claim 1 where one of the output ports receives a door unlocking signal from the control circuits.

5. An apparatus as in claim 4 where one of the input ports receives a request for exit signal.

6. An apparatus as in claim 1 where the control circuits, responsive to an authorization command from the inductor, transmit a signal to one of the output ports to release a door latch.

7. An apparatus as in claim 1 which includes a second unit, separate from the door mountable unit, which includes a second housing, the second housing carries a second electrical energy transmitting inductor and at least one of a second input port or a second output port.

8. An apparatus as in claim 7 where the port is adapted to be coupled to one of a multi-conductor cable, or, a computer network.

9. A modular lock control system comprising:

a door side module, wherein the door side module includes a door housing that carries a door inductor coupled to door control circuits, the door housing also carries a door interface with the door interface having a door latch control output and an authorization indicia input; and a frame side module, wherein the frame side module includes a frame housing that carries a frame inductor coupled to frame control circuits, the frame housing also carries a frame interface with at least one power port to couple electrical energy to the frame inductor and at least one data port to at least transmit indicia to a displaced location.

10. A system as in claim 9 where the door interface is coupled, at least in part, to the door control circuits.

11. A system as in claim 10 where the door interface includes an exit request signal input.

12. A system as in claim 11 wherein the door inductor couples electrical energy to and receives data signals from the door control circuits.

13. A system as in claim 12 wherein the door control circuits, responsive to signals from the door inductor, emit a door latch control signal to the door latch control output.

14. A system as in claim 12 where the door control circuits respond to a loss of electrical energy from the door inductor as indicative of a door open condition.

15. A system as in claim 14 where the door control circuits respond to a restoration of electrical energy from the door inductor as indicative of a door closed condition.

16. A system as in claim 9 where the frame interface is coupled, at least in part, to the frame control circuits.

17. A system as in claim 16 where the frame inductor couples electrical energy to the door inductor.

18. A system as in claim 16 where the frame inductor receives electrical energy from the frame interface.

19. A system as in claim 18 where the frame inductor couples the authorization indicia to the frame interface.

20. A system as in claim 19 where the frame interface couples door latch control signals to the frame control circuits.

21. A system as in claim 9 where the frame inductor and the door inductor form an electro-magnetic transfer circuit when the inductors have a predetermined positional relationship relative to one another.

22. A system as in claim 21 where the electrical energy is coupled from the frame inductor to the door inductor when the inductors exhibit the predetermined positional relationship relative to one another.

23. A system as in claim 21 with communications signals coupled between the inductors where the inductors exhibit the predetermined positional relationship relative to one another.

24. A system as in claim 23 where the electrical energy from the frame inductor energizes the door control circuits.

25. A system as in claim 24 wherein, responsive to the door control circuits receiving one of an authorization signal, or an exit request signal, the door inductor couples the signal to the frame inductor.

26. A system as in claim 25 where the frame control circuits receive the signal from the frame inductor and couples a representative thereof to the frame interface.

27. A door control apparatus comprising:

first and second separate housings, wherein the first housing is mountable in a door and the second housing is mountable in the vicinity of the door with each of the housings exhibiting at least one of an input port or an output port, wherein each of the housings includes an inductive coupling element with each inductive coupling element coupled to respective control circuits carried in the housing; and wherein the first housing receives at the input port a door access credential which is coupled to the second housing, and where the first housing receives, at a different input port, a manually generated exit request indicium.

* * * * *